US 12,109,971 B2

(12) United States Patent
Gordon et al.

(10) Patent No.: US 12,109,971 B2
(45) Date of Patent: Oct. 8, 2024

(54) CONDUCTIVE ACTUATOR HOUSINGS AND RELATED AIRBAG ASSEMBLIES

(71) Applicant: Autoliv ASP, Inc., Ogden, UT (US)

(72) Inventors: Scott Gordon, Layton, UT (US); Alan Larsen, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 212 days.

(21) Appl. No.: 17/852,329

(22) Filed: Jun. 28, 2022

(65) Prior Publication Data

US 2023/0415694 A1    Dec. 28, 2023

(51) Int. Cl.
 *B60R 21/2338*    (2011.01)
(52) U.S. Cl.
 CPC ............... *B60R 21/2338* (2013.01); *B60R 2021/23384* (2013.01); *B60R 2021/23388* (2013.01)

(58) Field of Classification Search
 CPC ............ B60R 2021/23388; B60R 2021/23384
 See application file for complete search history.

(56) References Cited

U.S. PATENT DOCUMENTS

| 8,397,639 | B2 * | 3/2013 | Gordon | ................ F42B 3/10 280/741 |
| 10,663,269 | B2 * | 5/2020 | Gordon | ................ B60R 16/023 |
| 11,180,107 | B2 * | 11/2021 | Peremarty | ........... B60R 21/2338 |
| 11,898,056 | B2 * | 2/2024 | Möller | ................ B05D 7/02 |
| 11,912,221 | B2 * | 2/2024 | Peremarty | ............. B60R 21/017 |
| 2010/0090445 | A1 | 4/2010 | Williams et al. | |
| 2012/0242068 | A1 | 9/2012 | Paxton et al. | |
| 2021/0170970 | A1 * | 6/2021 | Peremarty | ........... B60R 21/2338 |
| 2021/0170982 | A1 * | 6/2021 | Peremarty | ........... B60R 21/2338 |

FOREIGN PATENT DOCUMENTS

| DE | 20020098 | 4/2001 | |
| DE | 102008052399 | 4/2010 | |
| EP | 1686020 | 8/2006 | |
| WO | WO-2005097902 A1 * | 10/2005 | ............... B05D 7/52 |

OTHER PUBLICATIONS

102008052399, TRW Airbag SYS GMBH, Machine Translation (13 pgs).
1686020, GM Global Tech Operations, Machine Translation (23 pgs).
PCT/US2023/024201, International Search Report, (5 pgs).
PCT/US2023/024201, Written Opinion (5 pgs).

* cited by examiner

*Primary Examiner* — Jason D Shanske
*Assistant Examiner* — Joselynn Y Sliteris
(74) *Attorney, Agent, or Firm* — Matthew D. Thayne; Thayne and Davis LLC

(57) ABSTRACT

Actuator housings for airbag modules and related assemblies. In some embodiments, an airbag assembly may comprise an electrically conductive piece and an electro-explosive device coupled with the electrically conductive piece and positioned adjacent to the electrically conductive piece. The assembly may further comprise a housing for the electro-explosive device. The housing may be at least partially defined by a conductive plastic material having an electrical conductivity less than that of the electrically conductive piece.

13 Claims, 4 Drawing Sheets

CONDUCTIVE ACTUATOR HOUSINGS AND RELATED AIRBAG ASSEMBLIES

SUMMARY

Electrostatic discharge is often a problem requiring mitigation in conjunction with vehicle safety systems having electro-explosive devices, such as tether release actuators. Such electro-explosive devices are often housed in non-conductive plastics, which can result in undesirable triboelectric charge accumulation, which can result in sudden electrostatic discharge and/or premature ignition. Mitigating such outcomes may require extensive and/or expensive components for controlling triboelectric charge buildup, such as ground wires, metal encasings, connectors sockets, and/or shorting clips for ground connection.

The present inventors have therefore determined that it would be desirable to provide apparatus, systems and methods that overcome one or more of the foregoing limitations and/or other limitations of the prior art. In some embodiments, the inventive concepts disclosed herein may therefore allow for controlling triboelectric charge buildup, eliminating or at least substantially reducing the risk of premature ignition, and/or reducing the breakover voltage associated with the electro-explosive device, housing, and/or related module by replacing the insulating material of the electro-explosive device/actuator housing with a relatively more electrically conductive material, such as a conductive plastic in preferred embodiments.

In a more particular example of an airbag assembly according to some embodiments, the airbag assembly may comprise an electrically conductive piece and an electro-explosive device coupled with the electrically conductive piece and positioned adjacent to the electrically conductive piece. The assembly may further comprise a housing for the electro-explosive device, which housing may be at least partially defined by a conductive plastic material having an electrical conductivity less than that of the electrically conductive piece.

In some embodiments, the electro-explosive device may be configured to release a tether.

In some embodiments, the housing may be wholly defined by the conductive plastic material. Alternatively, the housing may only be partially defined by the conductive plastic material. For example, the housing may comprise a piece or section that defines a complete path between a portion of the housing defining a spark gap associated with the electro-explosive device to a more conductive and/or metallic portion of the assembly.

In some embodiments, the electrically conductive piece may comprise a plate, such as a backer plate of an inflator module, for example.

In some embodiments, the electrically conductive piece may comprise a metallic piece.

In some embodiments, the housing may be configured to receive the electro-explosive device so as to maintain a spark gap between a portion of the electro-explosive device and the housing. In some such embodiments, the spark gap may be configured with a consistent distance, a minimum distance, and/or an average distance of between about 0.3 mm and about 1.5 mm. In some embodiments, the portion of the electro-explosive device defining the spark gap may comprise an initiator cup.

In a specific example of an actuator module for an airbag assembly, the actuator module may comprise an electro-explosive device comprising an initiator cup. The actuator module may further comprise a housing for the electro-explosive device, the housing configured to receive the electro-explosive device so as to maintain a spark gap between the initiator cup and the housing. At least a portion of the housing defining the spark gap may comprise a conductive plastic material. In some embodiments, the housing may be wholly defined by a conductive plastic material. The actuator module may further comprise a metallic portion. The conductive plastic material may extend from the at least a portion of the housing defining the spark gap to the metallic portion.

In some embodiments, the conductive plastic material may have a lower electrical conductivity than the metallic portion.

In some embodiments, the electro-explosive device may be configured to release an airbag cushion tether.

In some embodiments, the metallic portion may comprise a metallic plate, such as a backer plate for an inflation module. In some such embodiments, the metallic plate may be part of a module body of the actuator module. In some such embodiments, the housing may be configured to lower a break-over voltage associated with the module body.

In a specific example of a tether release actuator assembly according to some embodiments, the assembly may comprise an electro-explosive device configured to release a tether upon actuation; a body at least partially defined by a first material having a first electrical conductivity; and a housing coupled to the body. The housing may be configured to receive the electro-explosive device therein, and may comprise, in some cases wholly comprise, a second, non-insulating material having a second electrical conductivity lower than the first electrical conductivity.

In some embodiments, the housing may be configured to drain triboelectric charge from the electro-explosive device.

In some embodiments, the housing may be configured to lower a break-over voltage of the body.

In some embodiments, the first material may comprise a metal and/or the second material may comprise a conductive plastic. In some such embodiments, the conductive plastic may comprise a polyamide material modified to increase electrical conductivity.

In some embodiments, The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
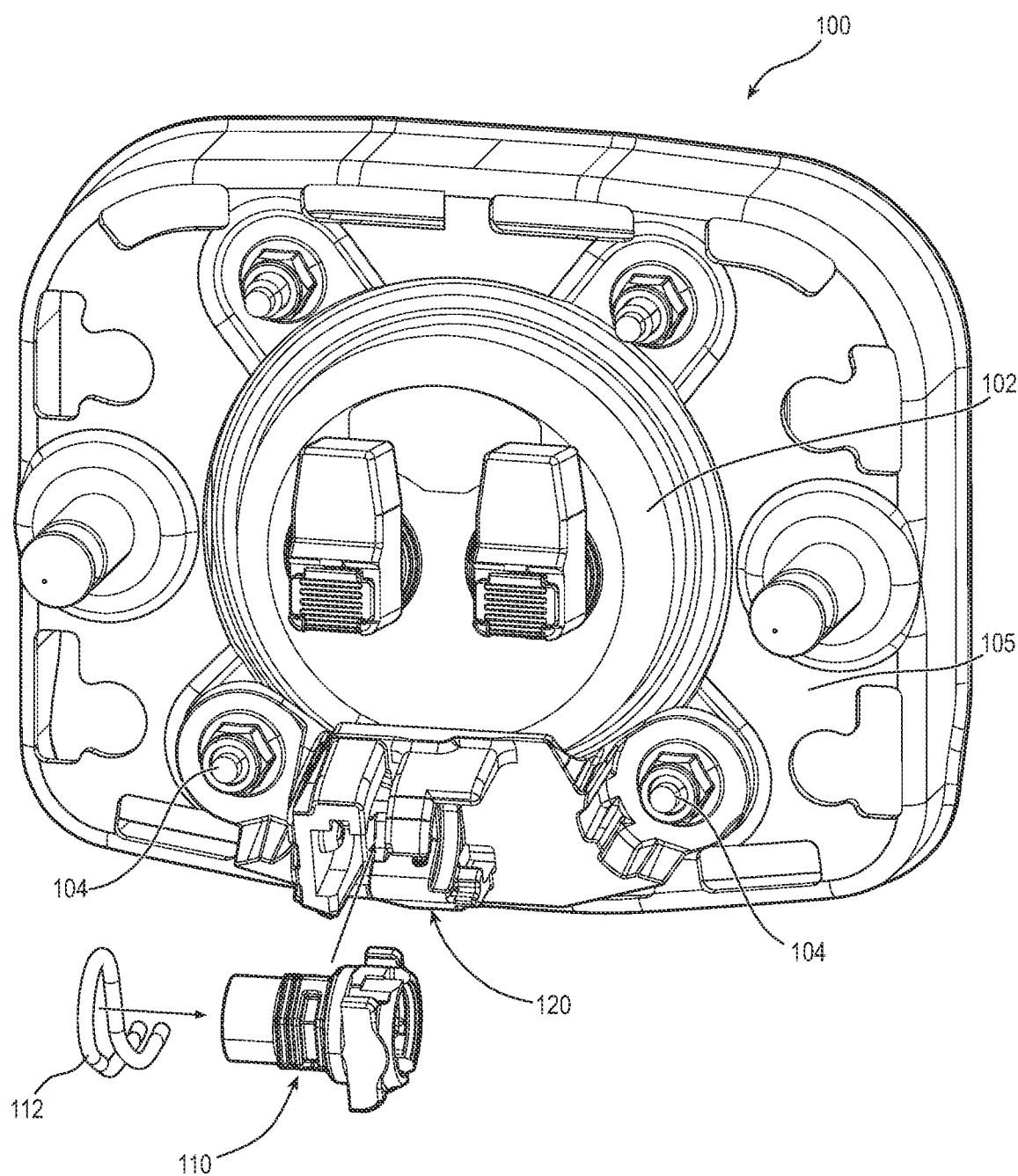
FIG. 1 depicts a perspective view of an airbag module assembly comprising a tether release actuator according to some embodiments.
Figure 2:
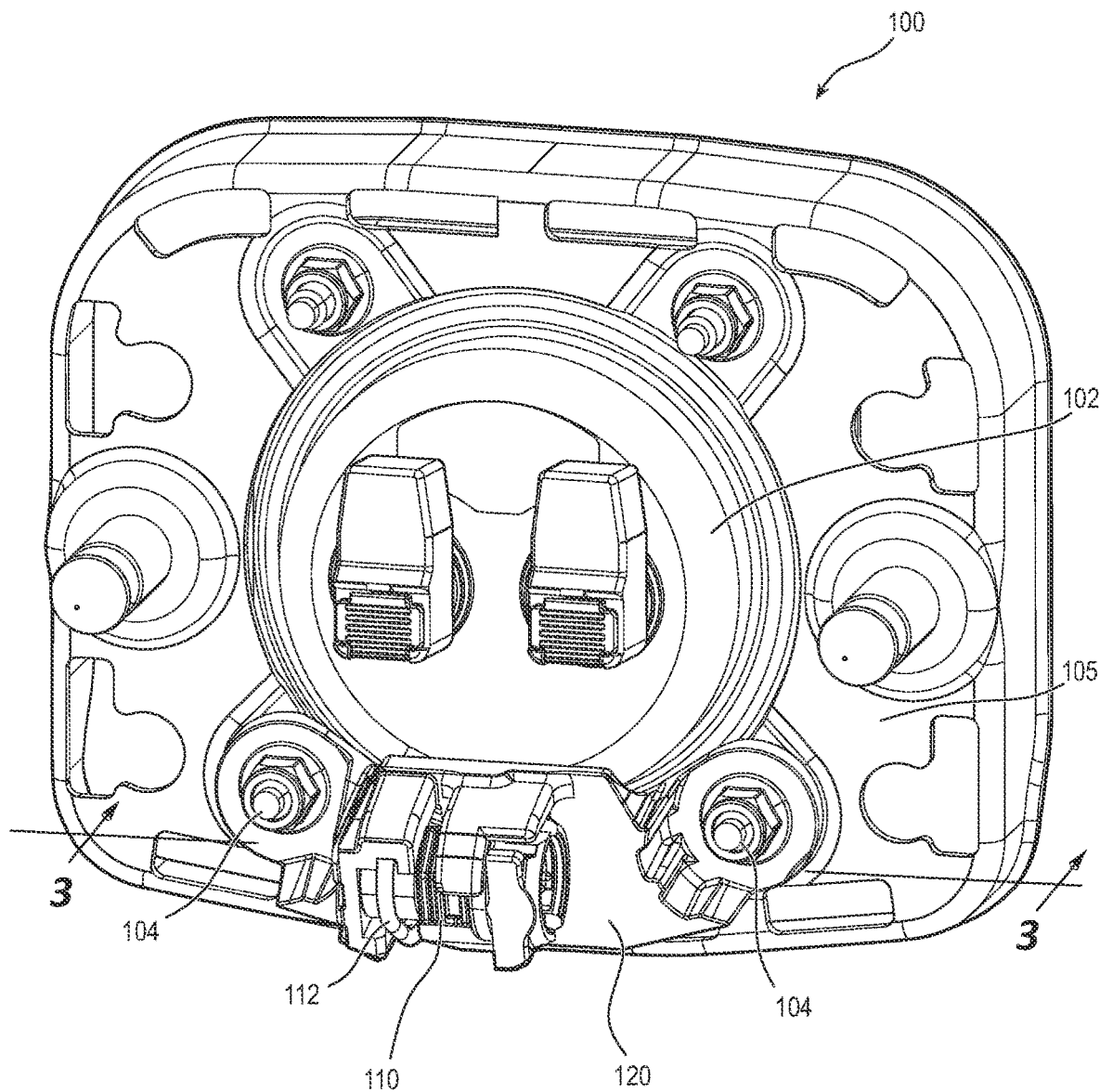
FIG. 2 depicts the airbag module assembly of FIG. 1 with the tether release actuator positioned within an electrically conductive actuator housing of the airbag module assembly.

FIGS. 1 and 2 depict an inflator module 100 for an airbag assembly according to some embodiments. Module 100 comprises an inflator body 102, which, as described below, may serve as a common ground for a tether release actuator 110. Module 100 further comprises a backer plate 105, which is electrically grounded to the inflator body 102. An actuator housing 120, which is configured to receive tether release actuator 110 is coupled to the backer plate 105 of module 100 by way of one or more fasteners 104. FIG. 1 shows the tether release actuator 110 exploded away from its seat within actuator housing 120 and FIG. 2 shows the tether release actuator 110 seated within actuator housing 120.

Preferably, actuator housing 120, or in some contemplated embodiments at least a portion of actuator housing 120, comprises a material having an electrical conductivity that is greater than that of the insulating, plastic materials often used for such housings. In some such preferred embodiments, however, this material may have an electrical conductivity that is less than that of the conductive (typically metallic) elements that provide an electrical path to ground, which may allow triboelectric charges to drain from module 100. In preferred embodiments, this material may comprise a conductive plastic material, such as, for example, a polyamide material modified to increase electrical conductivity. In a more specific example of a suitable material for this purpose, the material may comprise a reinforced polyamide 6 sold by Akulon® under the identifier K224-PGC62.

FIG. 2 further depicts the presence of a tether 112 along a portion of actuator 110, which, as those of ordinary skill in the art will appreciate, may be coupled with an airbag cushion or a related component of an airbag cushion, such as a vent opening or the like. Actuator 110 may therefore be used to, upon actuation, release tether 112 to effect one or more aspects of the deployment characteristics of an airbag cushion. It should be understood, however, that alternative embodiments are contemplated in which actuator 110 may be used for other purposes, such as seat belt pretensioners or any other application in which use of an insulating plastic for a housing for the actuator results in an undesirable build-up of triboelectric charge.

Figure 3:
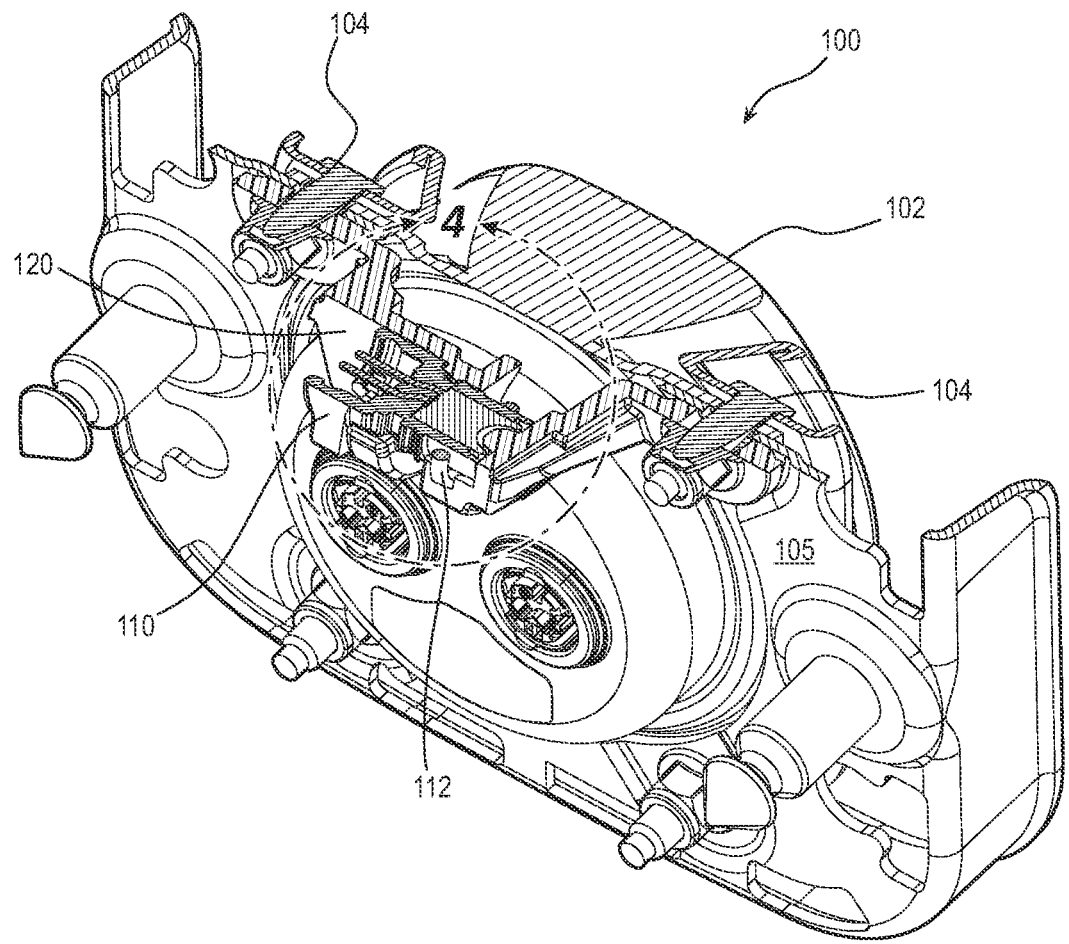
FIG. 3 is a cross-sectional view taken along line 3-3 of FIG. 2.

FIG. 3 is a cross-sectional view taken through the actuator 110 and its actuator housing 120. As shown in this figure, the actuator 110 may be in proximity and/or contact with one or more regions of the semi-conductive housing 120, which may allow for safely draining triboelectric charge to conductive and/or metallic regions of the module 100, which may allow such charges to ultimately be delivered to ground.

Figure 4:
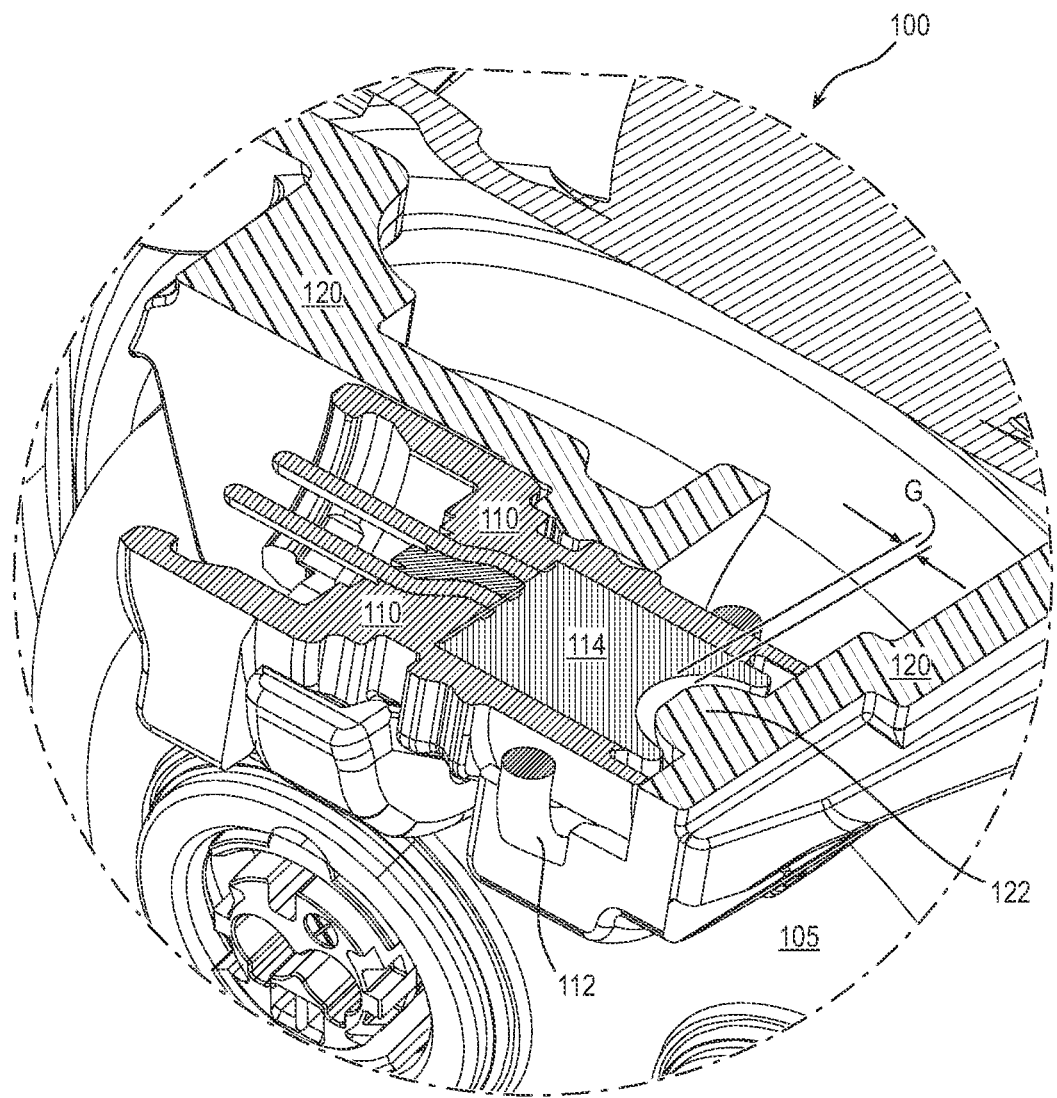
FIG. 4 is an enlarged view of the cross-section of FIG. 3.

FIG. 4 is an enlarged view of the cross-section of FIG. 3. As shown in this figure, in certain preferred embodiments, a spark gap G may be present between a portion of the actuator 110 and at least a portion of the housing 120. More particularly, in the depicted embodiment, spark gap G is positioned between an initiator cup 114 and an adjacent portion of the housing 120. Maintaining a relatively small air/spark gap G, preferably in combination with use of a conductive plastic material or another material having electrical conductivity between that of a fully conductive material, such as a metal, and an insulating material, such as an insulting plastic, may allow for substantially lowering the break-over voltage associated with the actuator 110, housing 120, and/or module 100.

For example, the present inventors have discovered that the break-over voltage may be lowered from between about 23 and about 26 kV to between about 2 and about 5 kV by replacing a typical insulative plastic for the housing 120 with a conductive plastic, as disclosed herein. This may allow the break-over voltage to be controlled by design control. Thus, it may be desirable to design the module/system such that the break-over voltage is lower, in some cases substantially lower, than the initiator electrostatic discharge (ESD) no-fire withstand level. In other words, configuring the break-over voltage to be less than the ESD no-fire withstand level may be used to eliminate, or at least substantially reduce, the chances for triboelectric charge to build up to dangerous levels that might cause the initiator of the electro-explosive device.

In some embodiments, spark gap G may comprise a distance—in some cases a consistent distance and/or average distance, or at least substantially consistent and/or average distance, measured at several points along the gap, and in other cases may comprise a minimum distance between the initiator cup or another relevant portion of the actuator and the accompanying housing—of between about 0.3 mm and about 1.5 mm.

As previously mentioned, although it may be simpler to construct the entire housing 120 from a conductive or relatively (compared with the fully conductive and/or metallic regions of the module 100) conductive material rather than an insulating material, it is contemplated that some embodiments may be configured to be only partially, rather than fully, constructed from such a material. For example, in some embodiments, a portion of the housing 120 that defines the spark gap G may comprise the aforementioned relatively/semi-conductive material. Preferably, the housing 120 is constructed such that this material at least extends in continuous form all the way to a metallic/fully conductive piece, such as a metallic portion of the module 100 or to a portion of the vehicle chassis to which the module 100 and/or housing 120 is mounted.

Thus, in the context of the embodiment depicted in the drawings, for example, as an alternative to forming the entire housing 120 from the relatively/semi-conductive material, the protrusion 122 that extends within initiator cup 114 defines spark gap G may be formed from this conductive plastic or another relatively conductive material. This material may then extend along one or more paths, preferably continuously, to, for example, one or more fasteners 104 or another element preferably in contact with backer plate 105 and/or another metallic portion of module 100.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An airbag assembly, comprising:
 an electrically conductive piece;
 an electro-explosive device coupled with the electrically conductive piece and positioned adjacent to the electrically conductive piece; and
 a housing for the electro-explosive device, wherein the housing is at least partially defined by a conductive plastic material having an electrical conductivity less than that of the electrically conductive piece, and wherein the housing is configured to receive the electro-explosive device so as to maintain a spark gap between a portion of the electro-explosive device and the housing.

2. The airbag assembly of claim 1, wherein the electro-explosive device is configured to release a tether.

3. The airbag assembly of claim 1, wherein the housing is wholly defined by the conductive plastic material.

4. The airbag assembly of claim 1, wherein the electrically conductive piece comprises a plate.

5. The airbag assembly of claim 1, wherein the electrically conductive piece comprises a metallic piece.

6. The airbag assembly of claim 1, wherein the portion of the electro-explosive device comprises an initiator cup.

7. An actuator module for an airbag assembly, comprising:
 an electro-explosive device comprising an initiator cup;
 a housing for the electro-explosive device, the housing configured to receive the electro-explosive device so as to maintain a spark gap between the initiator cup and the housing, wherein at least a portion of the housing defining the spark gap comprises a conductive plastic material; and
 a metallic portion, wherein the conductive plastic material extends from the at least a portion of the housing defining the spark gap to the metallic portion.

8. The actuator module of claim 7, wherein the housing is wholly defined by the conductive plastic material.

9. The actuator module of claim 7, wherein the conductive plastic material has a lower electrical conductivity than the metallic portion.

10. The actuator module of claim 7, wherein the electro-explosive device is configured to release an airbag cushion tether.

11. The actuator module of claim 7, wherein the metallic portion comprises a metallic plate.

12. The actuator module of claim 11, wherein the metallic plate is part of a module body of the actuator module.

13. The actuator module of claim 12, wherein the housing is configured to lower a break-over voltage associated with the module body.

* * * * *